Figure 1:
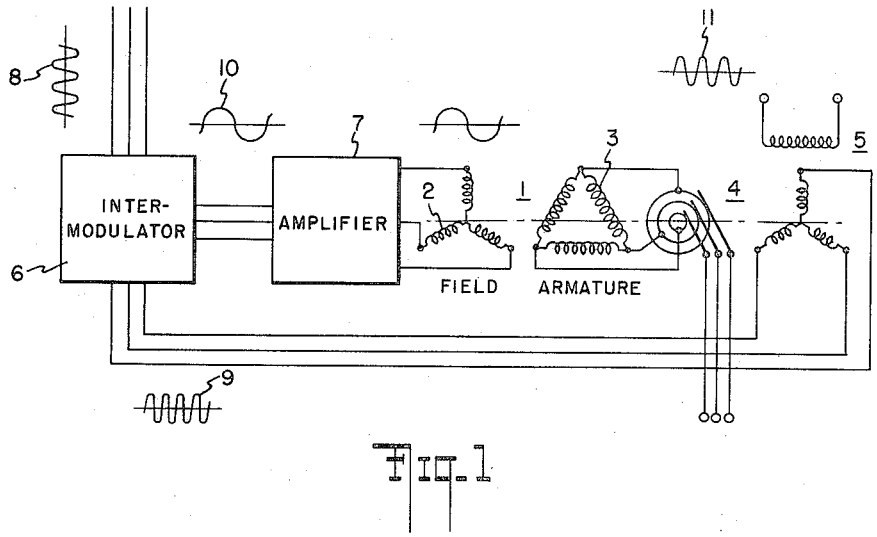

INVENTOR
WILFRED LEWIS TURVEY
BY
Herbert H Thompson
ATTORNEY

April 1, 1958 W. L. TURVEY 2,829,333
CONSTANT-FREQUENCY ALTERNATING-CURRENT GENERATORS
Filed April 23, 1956 2 Sheets-Sheet 2

INVENTOR
WILFRED LEWIS TURVEY
BY
Herbert H. Thompson
ATTORNEY

United States Patent Office 2,829,333
Patented Apr. 1, 1958

2,829,333

CONSTANT-FREQUENCY ALTERNATING-CURRENT GENERATORS

Wilfrid Lewis Turvey, Kew, England, assignor to The Sperry Gyroscope Company Limited, Brentford, England, a company of Great Britain Application April 23, 1956, Serial No. 580,049

Claims priority, application Great Britain April 22, 1955

8 Claims. (Cl. 322—32)

This invention relates to systems and methods for generating alternating current of constant frequency.

In ordinary A.-C. generating equipment an alternating current generator is driven by some motor or prime mover, and the frequency of the alternating-current output of the generator depends on the speed of the motor. Many proposals for generating constant-frequency alternating current therefore operate by controlling the speed of the motor, or otherwise controlling the rotational speed of the generator itself. In general such proposals have not effectively prevented small changes in speed of the generator and hence in the frequency of the alternating-current output. Other proposals for generating constant-frequency alternating current have consisted in supplying a constant frequency exciting current from a constant frequency reference source to energise the field winding of a generator of the amplidyne or metadyne type so that this shall generate an output at the frequency of excitation of the field.

Another proposal has been to employ a main generator and an auxiliary generator with rotors mechanically coupled together. Both generators have three-phase stator and rotor windings, and the rotor winding of the auxiliary generator is arranged to supply the rotor winding of the main generator. A reference three-phase voltage of the desired frequency is supplied to the stator windings of the auxiliary generator to produce a rotating field therein. This field induces currents in the auxiliary rotor winding which produce in the main rotor a field which, while rotating with respect to the rotor at the difference in speed between that of the auxiliary generator stator field and that of the rotors, rotates with respect to the main generator stator at the same speed as that of the auxiliary generator stator field. Hence the output frequency is the same as the reference frequency. In this last proposal, when the rotor speeds are equal to that of the auxiliary generator stator field, no voltage is induced in the auxiliary generator rotor winding and the output of the system is then zero.

The present invention, according to one aspect, consists in a method of generating a constant frequency alternating current wherein a main generator of the non-salient-pole type having a polyphase stator winding has its rotor driven approximately at the speed (hereinafter called the ideal speed) at which the generator output is of the desired frequency when the exciting field produced by the stator windings is stationary, while means responsive both to the actual rotor speed and to a reference frequency energises the stator winding of the main generator in such a manner as to produce an exciting field having a rotational speed equal to the difference between the ideal speed and the actual speed of the main generator rotor and a sense of rotation such that the rotor and exciting field have a relative rotational speed equal to the ideal speed.

According to a second aspect of the invention, a system for generating a constant-frequency alternating current comprises a main generator of the non-salient-pole type having a polyphase stator winding, means for rotating the generator rotor at a speed approximating to the ideal rotor speed, a source of reference alternating voltage of frequency corresponding to or bearing a convenient numerical relation to the ideal speed of the generator, and means responsive both to the actual rotor speed of the main generator and to the reference frequency and connected to energise the polyphase stator winding of the main generator for producing an exciting field which is stationary if the rotor speed equals the ideal speed and which otherwise has a rotational speed equal to the difference between the ideal speed and the actual speed of the main generator rotor and a rotational speed relative to the rotor which is equal to the ideal speed.

In one embodiment of the invention the means responsive to the main generator rotor speed and to the reference frequency comprises rotor-speed-responsive means for producing an alternating voltage having a frequency corresponding to the actual rotor speed or a multiple of that speed, an intermodulator for deriving a beat frequency from the reference alternating voltage and the output voltage of the speed responsive means, and means for amplifying the output of the intermodulator and applying it to the windings of the main generator stator for producing the rotatable exciting field.

In another embodiment the means responsive to the main generator rotor speed and to the reference frequency comprises a commutator arranged to be driven synchronously with the rotor of the main generator for deriving from the reference frequency an output or outputs each of which, when the rotor and commutator are driven synchronously with the reference frequency, is a complex wave having a D.-C. component dependent in sense and magnitude upon the relative phasing of the commutation and the reference frequency, while when they are driven asynchronously with the reference frequency each output is a complex wave including a component alternating at the difference frequency, means being provided for filtering the commutator output or outputs and applying them to the main generator stator for producing the rotatable exciting field.

In a third embodiment the means responsive to the main generator rotor speed and to the reference frequency comprises an auxiliary generator having a rotor which is arranged to be driven synchronously with the main generator rotor and the winding of which is energised through slip rings by polyphase currents obtained from the reference frequency source whereby a magnetic field is produced rotating at the ideal speed relatively to the rotor of the auxiliary generator, the auxiliary generator rotor being further connected to a commutator co-operating with fixed brushes for deriving a polyphase output which is applied to the stator windings of the main generator for producing an exciting field which rotates at the difference between actual and ideal rotor speeds.

In a fourth embodiment, the means responsive to the main generator rotor speed and to the reference frequency comprises a polyphase transformer excited by the reference frequency, a stationary commutator the bars of which are connected to a plurality of taps on the transformer windings, a plurality of brushes co-operating with the commutator and rotating therearound at the same speed as the main generator rotor, and a brush engaging each slip ring and connected to a corresponding terminal of the main generator stator winding.

Figure 2:
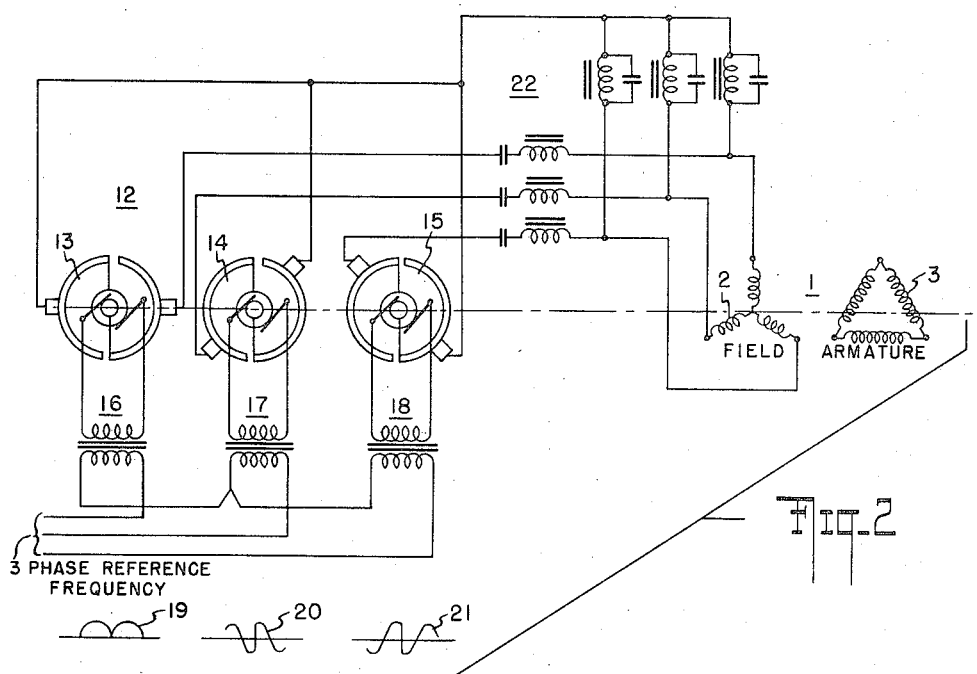
Figure 3:
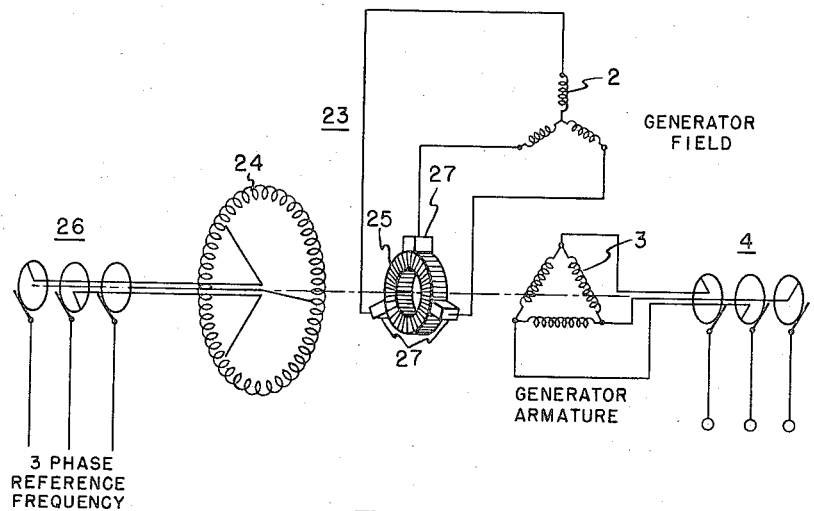
Figure 4:
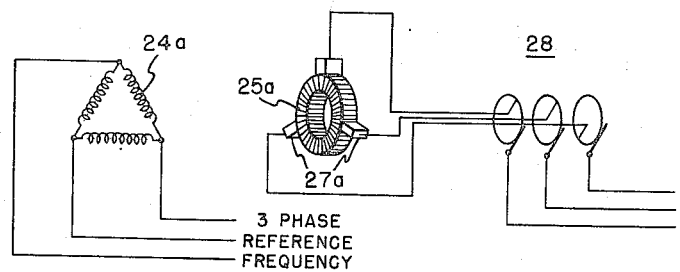

In order that the invention may be clearly understood and readily carried into effect, four constant-frequency generating systems embodying the invention will now be described by way of example with reference to the accompanying drawings. In the drawings, Fig. 1 shows a generating system with frequency control means including an intermodulator, Fig. 2 shows a generating system with frequency control means including a commutator, Fig. 3 shows a system in which the frequency control means includes an auxiliary generator having its rotor winding connected both to slip rings and to a commutator, Fig. 4 shows a modification of the Fig. 3 embodiment in which the auxiliary generator is replaced by a transformer and a stationary commutator co-operates with rotating brushes.

Referring to Fig. 1, a main generator 1 of the non-salient-pole type, that is to say, a machine with symmetrically formed stator and rotor, is provided with a three phase stator winding 2 and a rotor winding 3 connected to slip rings 4. The rotor is arranged to be driven by a motor (not shown) at a speed approximating to that which causes the main generator to generate an A.-C. output of a desired frequency when the exciting field winding 2 of the stator is energised by direct current. Auxiliary generator 5 embodied in or mechanically coupled to the main generator is arranged to produce a three-phase alternating voltage having a frequency corresponding to the main generator rotor speed. Also provided is a three-phase source of reference A.-C. voltage (not shown) which defines the desired output frequency with high frequency accuracy.

The output of the auxiliary generator 5, and the reference voltage, are applied to an intermodulator 6 of known construction which intermodulates the two voltages and extracts the beat frequency. The beat frequency is amplified in amplifier 7 and the amplifier output is applied appropriately to the polyphase stator windings 2 to produce an exciting field which rotates. The rotational speed of the exciting field is equal to the difference between the ideal rotor speed and the actual rotor speed, and its sense of rotation is such that the relative rotational speed of the rotor and exciting field of the main generator is equal to the ideal speed. The effect of the exciting field upon the main generator rotor winding 3 then results in an output of the desired frequency.

This may more clearly be seen from an examination of the output curves of Fig. 1. Let it be supposed that the reference frequency source puts out exactly three cycles in a given unit of time (curve 8) while the speed of the main and auxiliary generators is such that the auxiliary generator 3 puts out exactly four cycles in the same time (curve 9). The intermodulator 6 then puts out exactly one cycle in the given time (curve 10) which is applied after amplification in amplifier 5 to stator winding 2. This produces a field which rotates relative to the field winding at the difference speed and relative to the rotor winding at the ideal speed, whence the main generator puts out exactly three cycles in the given unit of time (curve 11).

In the embodiment of Fig. 2 a main generator 1 similarly arranged to that of Fig. 1 has a commutator 12 mounted upon its rotor shaft. The commutator comprises three sections 13, 14 and 15 and the reference source is an oscillator (not shown) producing a three-phase output. The oscillator is coupled to the commutator sections 13, 14 and 15 by transformers 16, 17 and 18 respectively, so that when the commutator is driven synchronously with the reference frequency, in other words, when the generator is driven at the ideal speed, the commutator sections produce outputs each of which is a complex wave having a D.-C. component dependent in sense and magnitude upon the relative phasing of the commutation and the reference frequency. The curves 19, 20 and 21 show such complex waves for the sections of the commutators 13, 14 and 15 for a particular relative phasing of the commutation and reference frequency.

When the commutator is driven asynchronously with the reference frequency, each output is a complex wave including a component alternating at the difference frequency. The commutator output is filtered by a filter 22 consisting of an arrangement of reactors and capacitors connected as shown, so that the D.-C. component or difference frequency component is extracted. The difference frequency component is of a much lower frequency than the commutation frequency. The filtered output of the commutator, which may be amplified if necessary by an amplifier not shown in the drawing, is applied to the stator winding 2 of the generator to produce an exciting field having a rotational speed relative to the rotor equal to the ideal speed.

In the embodiment of Fig. 3 an auxiliary generator has its rotor mounted on the shaft of the main generator, or otherwise arranged to be driven synchronously with the main generator rotor. The rotor of the auxiliary generator turns inside a fixed stator and has a three-phase winding 24 connected to a commutator 25 at circumferentially spaced points to the correspondingly spaced commutator segments. These connections are not shown, in order to make the drawing clearer. Three-phase currents supplied by the reference frequency source are applied to the auxiliary generator windings through slip rings 26, so that a magnetic field is produced rotating relatively to the auxiliary rotor winding 24 at the ideal speed. Hence, except when the main and auxiliary rotors are rotating at the ideal speed, the magnetic field rotates in relation to the commutator brushes 27 at a comparatively slow speed equal to the difference between the ideal speed and the actual rotor speed.

The auxiliary generator therefore generates three phase alternating currents which are applied to the stator winding 2 of the main generator to produce an exciting field rotating in the appropriate sense at the difference between the ideal and actual speeds of the main generator rotor. When the actual speed is equal to the ideal speed, the auxiliary generator produces three-phase direct currents which produce a stationary exciting field in the main generator stator winding 2.

It will be evident that the auxiliary generator must be one in which any relative angular position is possible between the brushes and the D.-C. field. For this reason, the fixed stator (not shown) must be of the non-salient-pole type. Further, it may carry compensating windings connected in series with the brushes.

Fig. 4 shows one manner in which the embodiment of Fig. 3 may be modified. The auxiliary generator is replaced by a three-phase transformer 24a excited by the reference frequency supply and having associated with it a stationary commutator the bars of which are connected to a plurality of taps (not shown) in the transformer windings in a manner corresponding to the connections between the rotor winding and commutator of the Fig. 3 embodiment. Co-operating with the commutator are three brushes 27a rotating about it at the same speed as the main generator and connected to slip rings 28, the slip ring brushes being appropriately connected to the terminals of the main generator field winding (not shown in this figure).

It will be seen that the frequency of the alternating voltage appearing across the slip rings will depend on the speed of rotation of the brushes. At synchronous speed this frequency will fall to zero and a continuous D.-C. voltage will occur between the slip rings 28. The effect on the stator field is as in the preceding embodiment.

In the operation of the system, variations may occur in the strength of the main generator field as the latter rotates at a varying rate in response to fluctuations in the speed of the rotor. Corresponding variations will then occur in the amplitude of the generator output. Further, a change in the actual rotor speed may affect the output amplitude in other ways. Accordingly, it may be desirable to incorporate into the above-described embodiments means for effecting automatic control of output amplitude. Means for this purpose preferably includes known means for detecting change in the amplitude of the output and arranged to generate an amplitude error signal on departure of the amplitude from a predetermined value. This signal is used to control the current energising the stator winding of the main generator. This control may be effected conveniently by using the amplitude error signal to control the amplitude of the reference voltage, or, in a case where a generator produces polyphase reference voltages, by so controlling the excitation of the reference generator. In this way, the polyphase voltages for supplying the polyphase exciting winding of the main generator are simultaneously controlled to maintain constant amplitude of the output.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of generating a constant-frequency alternating current wherein a main generator of the non-salient-pole type having a polyphase stator winding has its rotor driven approximately at the ideal speed (the speed at which the generator output is of the desired frequency when the exciting field produced by the stator windings is stationary), while means responsive both to the actual rotor speed and to a reference frequency energises the stator winding of the main generator for producing an exciting field having a rotational speed equal to the difference between the ideal speed and the actual speed of the main generator rotor and a sense of rotation such that the rotor and exciting field have a relative rotational speed equal to the ideal speed.

2. A system for generating a constant-frequency alternating current comprising a main generator of the non-salient-pole type having a polyphase stator winding, means for rotating the generator rotor at a speed approximating to the ideal rotor speed, a source of reference alternating voltage of a frequency bearing a convenient numerical relation to the ideal speed of the generator, and means responsive both to the actual rotor speed of the main generator and to the reference frequency and connected to energise the polyphase stator winding of the main generator for producing an exciting field which is stationary when the rotor speed equals the ideal speed and which otherwise has a rotational speed equal to the difference between the ideal speed and the actual speed of the main generator rotor and a rotational speed relative to the rotor which is equal to the ideal speed.

3. A system as claimed in claim 2 wherein the means responsive to the main generator rotor-speed and to the reference frequency comprises rotor-speed-responsive means for producing an alternating voltage having a frequency corresponding to the actual rotor speed, an intermodulator for deriving a beat frequency from the reference alternating voltage and the output voltage of the speed responsive means, and means for amplifying the output of the intermodulator and applying it to the windings of the main generator stator for producing the rotatable exciting field.

4. A system as claimed in claim 2 wherein the means responsive to the main generator rotor speed and to the reference frequency comprises a commutator arranged to be driven synchronously with the rotor of the main generator for deriving from the reference frequency an output or outputs each of which, when the rotor and commutator are driven synchronously with the reference frequency, is a complex wave having a D.-C. component dependent in sense and magnitude upon the relative phasing of the commutation and the reference frequency, while when they are driven synchronously with the reference frequency each output is a complex wave including a component alternating at the difference frequency, means being provided for filtering the commutator output or outputs and applying them to the main generator stator for producing the rotatable exciting field.

5. A system as claimed in claim 4 wherein the reference voltage source produces a polyphase output.

6. A system as claimed in claim 5 including an amplifier for amplifying the commutator output after it is filtered and before it is applied to the main generator stator windings.

7. A system as claimed in claim 2 wherein the means responsive to the main generator rotor speed and to the reference frequency comprises an auxiliary generator having a rotor which is arranged to be driven synchronously with the main generator rotor and the winding of which is energised through slip rings by polyphase currents obtained from the reference frequency source whereby a magnetic field is produced rotating at the ideal speed relatively to the rotor of the auxiliary generator, the auxiliary generator rotor being further connected to a commutator co-operating with fixed brushes for deriving a polyphase output which is applied to the stator winding of the main generator for producing an exciting field which rotates at the difference between actual and ideal rotor speeds.

8. A system as claimed in claim 2 wherein the means responsive to the main generator rotor speed and to the reference frequency comprises a polyphase transformer excited by the reference frequency, a stationary commutator the bars of which are connected to a plurality of taps on the transformer windings, a plurality of brushes co-operating with the commutator and rotating at the same speed as the main generator rotor, and a brush engaging each slip ring and connected to a corresponding terminal of the main generator stator winding.

No references cited.